(12) United States Patent
Deragården

(10) Patent No.: US 12,037,016 B2
(45) Date of Patent: Jul. 16, 2024

(54) CONTROL SYSTEM AND METHOD FOR A TRAILER OR DOLLY

(71) Applicant: VOLVO TRUCK CORPORATION, Gothenburg (SE)

(72) Inventor: Hans Deragården, Kullavik (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 232 days.

(21) Appl. No.: 17/643,063

(22) Filed: Dec. 7, 2021

(65) Prior Publication Data

US 2022/0185329 A1  Jun. 16, 2022

(30) Foreign Application Priority Data

Dec. 10, 2020 (SE) .................. 20213082.9

(51) Int. Cl.
*B60W 60/00* (2020.01)

(52) U.S. Cl.
CPC ... *B60W 60/0015* (2020.02); *B60W 2420/403* (2013.01); *B60W 2520/22* (2013.01); *B60W 2530/203* (2020.02); *B60W 2556/65* (2020.02)

(58) Field of Classification Search
CPC ......... B60W 60/0015; B60W 2420/42; B60W 2520/22
See application file for complete search history.

(56) References Cited

U.S. PATENT DOCUMENTS

| | | | | |
|---|---|---|---|---|
| 8,442,508 | B2 * | 5/2013 | Harter ................... | G06F 3/0482 455/418 |
| 8,801,000 | B1 * | 8/2014 | Power .................... | B60P 1/027 280/6.151 |
| 2012/0193153 | A1 * | 8/2012 | Wellborn ............... | B60W 10/08 180/14.2 |
| 2012/0193154 | A1 * | 8/2012 | Wellborn ............... | B60W 10/04 180/14.2 |
| 2019/0233034 | A1 | 8/2019 | Viele et al. | |
| 2019/0375454 | A1 * | 12/2019 | Kasaiezadeh Mahabadi ............... | B62D 13/00 |
| 2020/0055357 | A1 * | 2/2020 | Laine .................... | B62D 15/02 |

(Continued)

FOREIGN PATENT DOCUMENTS

| | | | | |
|---|---|---|---|---|
| CA | 2397021 C | * | 12/2009 | ......... B62D 53/0828 |
| CN | 207433672 U | * | 6/2018 | |

(Continued)

OTHER PUBLICATIONS

European Search Report dated Apr. 7, 2021 in corresponding European Patent Application No. 20213082.9, 5 pages.

*Primary Examiner* — Redhwan K Mawari

(74) *Attorney, Agent, or Firm* — Venable LLP; Jeffri A. Kaminski

(57) ABSTRACT

A control system for a trailer or dolly, wherein the trailer or dolly comprises a perception sensor which is directed in a first travelling direction of the trailer or dolly and a coupling member for coupling with a vehicle further ahead in the first travelling direction, wherein the control system is configured to provide and/or use data from the sensor for a first control mode when the trailer or dolly is not coupled to the vehicle via the coupling member and to provide and/or use data from the sensor for a second control mode different from the first control mode when the trailer or dolly is coupled to the vehicle via the coupling member.

17 Claims, 5 Drawing Sheets

(56) References Cited

U.S. PATENT DOCUMENTS

| | | | | |
|---|---|---|---|---|
| 2020/0130582 A1* | 4/2020 | Wong | ............... | B62D 13/06 |
| 2020/0247373 A1* | 8/2020 | VanAntwerp | ......... | B60T 13/662 |
| 2021/0269092 A1* | 9/2021 | Golgiri | ............... | B62D 13/06 |
| 2021/0316580 A1* | 10/2021 | Shepard | ............... | G01B 7/30 |
| 2021/0331653 A1* | 10/2021 | Britsch | ............... | B60T 7/20 |
| 2021/0380100 A1* | 12/2021 | Sypitkowski | ..... | B60W 30/0953 |
| 2022/0153305 A1* | 5/2022 | Barckmann | ........ | B62D 63/025 |

FOREIGN PATENT DOCUMENTS

| | | | | |
|---|---|---|---|---|
| DE | 102005045196 A1 * | 9/2006 | ............ | B62D 13/06 |
| EP | 3951420 A1 * | 2/2022 | ........... | G01S 13/106 |

* cited by examiner

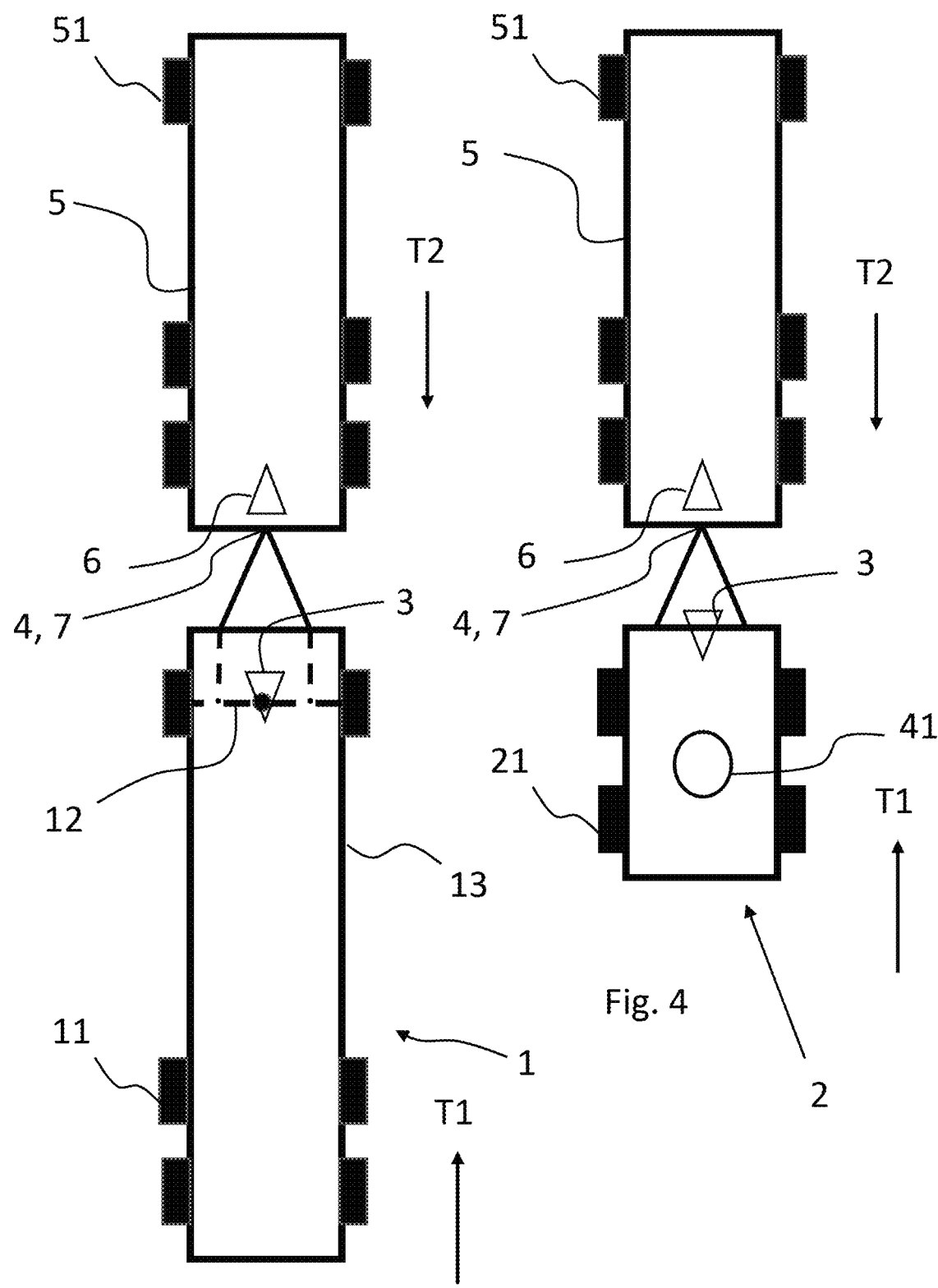

CONTROL SYSTEM AND METHOD FOR A TRAILER OR DOLLY

TECHNICAL FIELD

The invention relates to a control system for a trailer or dolly. The invention also relates to a trailer or dolly, a vehicle control system, a vehicle, a vehicle combination, a method for a trailer or dolly, a method for a vehicle, a computer program, and a computer readable medium.

The invention can be applied in heavy-duty vehicles, such as trucks, buses and construction equipment. Although the invention will be described with respect to a trailer or dolly for a heavy-duty truck, the invention is not restricted to this particular vehicle and vehicle combination, but may also be used in other vehicles.

BACKGROUND

An ongoing trend in the automotive industry is the use and implementation of external vehicle perception sensors, such as cameras. For example, it is well known to use rear-view cameras for assisting a driver during reversing.

Especially for commercial vehicles, typically trucks and truck and trailer combinations, external vehicle perception sensors are also used for more complicated tasks. These tasks include, but are not limited to, automatic or semi-automatic reverse assistance. For example, one or more external vehicle perception sensors may be used for estimating an articulation angle between a connected truck and trailer. The estimated angle can then be used in e.g. a reverse assistance system, i.e. the estimated angle may be used for controlling the movement of the vehicle combination during reversing.

Another trend for commercial vehicles is to provide more advanced trailers and dollies for trailers. A dolly, or dolly unit, may be part of a trailer or may be separate and connectable to a trailer. It may also be connectable to e.g. a towing truck. The more advanced trailer or dolly may for example comprise a propulsion unit, such as an electric motor, for propelling the trailer or dolly over a shorter distance, such as a shorter distance in a logistics area or the like. The trailer may thereby be able to move and position itself for e.g. loading/unloading of goods. In addition, the dolly may be able to e.g. move a trailer from one position to another position in the logistics area.

In view of the above, it has been realized that there are opportunities for developing further advanced trailers and dollies.

SUMMARY

An object of the invention is to provide an improved control system for a trailer or dolly. Another object of the invention is to provide an improved trailer or dolly, an improved vehicle control system, a vehicle and a vehicle combination. A yet further object of the invention is to provide an improved method for a trailer or dolly, an improved method for a vehicle, and also a computer program and a computer readable medium.

According to a first aspect of the invention, the object is achieved by a control system for a trailer or dolly according to claim 1. Thus, a control system for a trailer or dolly is provided, wherein the trailer or dolly comprises a perception sensor which is directed in a first travelling direction of the trailer or dolly and a coupling member for coupling with a vehicle further ahead in the first travelling direction, wherein the control system is configured to provide and/or use data from the sensor for a first control mode when the trailer or dolly is not coupled to the vehicle via the coupling member and to provide and/or use data from the sensor for a second control mode different from the first control mode when the trailer or dolly is coupled to the vehicle via the coupling member.

The first travelling direction may be a forward or a rearward direction of the trailer or dolly.

By the provision of a control system for a trailer or dolly as disclosed herein, a more versatile and flexible control of the trailer or dolly is achieved. In particular, the control system for the trailer or dolly can be a multi-purpose control system where the sensor data is used for and/or provided for more than one control mode, wherein the control modes are used when the trailer or dolly is coupled and uncoupled with respect to another vehicle. This implies increased efficiency, fewer sensors, cost-efficiency etc. For example, since the sensor data is used for more than one control mode, fewer sensors on the trailer or dolly may be required. In addition, by the provision of the control system for the trailer or dolly as disclosed herein, the sensor data may be provided to and used by a vehicle which is connected to, or intended to be connected to, the trailer or dolly, which will be further elaborated in the below.

Optionally, the first control mode may be a collision detection mode and/or a guidance control mode for the trailer or dolly. As such, the control system may be configured to use data from the sensor for the first control mode. Thereby, the first control mode may be a control mode performed by the control system of the trailer or dolly.

Optionally, the second control mode may be a guidance control mode for a vehicle combination which the trailer or dolly is part of when coupled to the vehicle. Preferably, the control system is configured to provide data to the vehicle, e.g. a towing vehicle, of the vehicle combination. Thereby, the second control mode may be a control mode performed by a vehicle control system of the vehicle, i.e. the towing vehicle.

Optionally, the data from the sensor for the second control mode may be indicative of an articulation angle of the vehicle combination which the trailer or dolly is part of when coupled to the vehicle, such as an articulation angle between the trailer or dolly and the vehicle. It has been realized that the articulation angle may advantageously be estimated by use of the perception sensor of the trailer or dolly. Accordingly, by way of example, the control system may be configured to obtain at least one image of the vehicle by use of the perception sensor when the trailer or dolly is coupled to the vehicle. The articulation angle may be estimated by use of the at least one image. Preferably, the control system is configured to obtain a sequence of images from the perception sensor during travelling of the vehicle combination, wherein the articulation angle, and its progress during travelling, is estimated by use of the sequence of images.

Optionally, the data from the sensor for the second control mode may be indicative of an articulation angle change of the vehicle combination which the trailer or dolly is part of when coupled to the vehicle, such as an articulation angle change between the trailer or dolly and the vehicle. It has further been realized that the articulation angle change may advantageously be estimated by use of the perception sensor of the trailer or dolly, whereby an absolute articulation angle may rather be estimated by use of a perception sensor of the vehicle. Accordingly, the control system may be configured to obtain at least one image of the vehicle by use of the perception sensor when the trailer or dolly is coupled to the vehicle. The articulation angle change may be estimated by use of the at least one image. Preferably, the control system is configured to obtain a sequence of images from the perception sensor during travelling of the vehicle combination, wherein the articulation angle change, and its progress during travelling, is estimated by use of the sequence of images.

An image as used herein may be any type of image which is obtainable by a perception sensor. The image may for example be an optical image obtained by a camera, but it may also be an image obtained by use of laser, radio waves, sound waves etc. Accordingly, any one of the perception sensors as disclosed herein may be a camera, a LIDAR (Light Detection And Ranging), a RADAR (RAdio Detection And Ranging), a SONAR (SOund Navigation And Ranging) or the like.

Optionally, the control system may be configured to provide data in the first control mode from the sensor to the vehicle during a coupling procedure with the vehicle. Thereby, a coupling procedure, which may be automatic, semi-automatic or manual, may be assisted by use of the sensor data from the perception sensor of the trailer or dolly. Still optionally, the provided data from the sensor to the vehicle during the coupling procedure may be indicative of a relative position and/or orientation between the trailer or dolly and the vehicle. For example, the provided data may comprise at least one image of the vehicle, whereby the relative position and/or orientation is obtained by use of the at least one image. Still optionally, the provided data from the sensor to the vehicle during the coupling procedure may comprise image data for a user of the vehicle so that the user can see an image of the vehicle. It has been realized that it may be beneficial for the user to see an image of the vehicle from the trailer's or dolly's perspective. The image may for example be complemented by an image of a vehicle perception sensor of the vehicle.

According to a second aspect of the invention, the object is achieved by a trailer or dolly according to claim 9. Thus, a trailer or dolly is provided which comprises a perception sensor which is directed in a first travelling direction of the trailer or dolly and a coupling member for coupling with a vehicle further ahead in the first travelling direction, wherein the trailer or dolly further comprises the control system according to any one of the embodiments of the first aspect.

Advantages and effects of the second aspect of the invention are largely analogous to the advantages and effects of the first aspect of the invention. It shall also be noted that all embodiments of the first aspect of the invention are applicable to and combinable with all embodiments of the second aspect, unless explicitly stated otherwise.

Optionally, the trailer or dolly may further comprise means for longitudinal and/or lateral motion control. As such, the trailer or dolly may further comprise a propulsion unit for propelling the trailer or dolly. It may further comprise at least one actuator for steering the trailer or dolly. Accordingly, the movement of the trailer or dolly, longitudinal and/or lateral, may be controlled by the means for longitudinal and/or lateral motion control. Still optionally, the longitudinal and/or lateral motion control may be adapted to be operated remotely from the trailer or dolly. Thereby, an operator, such as an operator of a logistics area or the like, may operate and control the movement of the trailer or dolly when it is uncoupled. Additionally, or alternatively, the trailer or dolly may further comprise means for autonomous motion control. Accordingly, the above-mentioned collision detection mode and/or guidance control mode may be used during the longitudinal and/or lateral movement of the trailer or dolly when the trailer or dolly is not coupled to the vehicle.

According to a third aspect of the invention, the object is achieved by a vehicle control system according to claim 13. Thus, a vehicle control system for a vehicle is provided, wherein the vehicle comprises a vehicle perception sensor which is directed in a second travelling direction and a coupling member for coupling with a trailer or dolly further ahead in the second travelling direction. The trailer or dolly is a trailer or dolly according to any one of the embodiments of the first aspect, and the second travelling direction is opposite to the first travelling direction, as seen along a travelling trajectory of a vehicle combination comprising the vehicle and the trailer or dolly. The vehicle control system is configured to use data from the vehicle perception sensor in a guidance control mode for a vehicle combination comprising the vehicle and the trailer or dolly, and wherein the vehicle control system is further configured to receive sensor data from the control system of the trailer or dolly for the guidance control mode.

By the provision of the vehicle control system as disclosed herein, improved control of the vehicle combination is achieved in that the vehicle also receives sensor data from the trailer or dolly for the guidance control mode. In particular, it has been realized that improved guidance control can be achieved by both using sensor data from the vehicle perception sensor and from the perception sensor of the trailer or dolly. For example, by combining the sensor data, further improved estimation of an articulation angle of the vehicle combination may be provided. The estimated articulation angle is preferably used for the guidance control mode.

It shall be noted that all embodiments of the third aspect of the invention are applicable to and combinable with all embodiments of the first and second aspects of the invention, and vice versa, unless explicitly stated otherwise.

According to a fourth aspect of the invention, the object is achieved by a vehicle according to claim 14. Thus, a vehicle is provided which comprises a vehicle perception sensor which is directed in a second travelling direction and a coupling member for coupling with a trailer or dolly further ahead in the second travelling direction, and wherein the vehicle further comprises the vehicle control system according to any one of the embodiments of the third aspect.

Advantages and effects of the fourth aspect are largely analogous to the advantages and effects of the third aspect. It shall also be noted that all embodiments of the fourth aspect of the invention are applicable to and combinable with all embodiments of the third aspect of the invention, and vice versa, unless explicitly stated otherwise.

According to a fifth aspect of the invention, the object is achieved by a vehicle combination according to claim 15. Thus, a vehicle combination is provided which comprises a vehicle according to any embodiment of the fourth aspect and a trailer or dolly according to any one of the embodiments of the second aspect.

Advantages and effects of the fifth aspect are largely analogous to the advantages and effects of the second and fourth aspects. It shall also be noted that all embodiments of the fifth aspect of the invention are applicable to and combinable with all embodiments of the other aspects of the invention, and vice versa, unless explicitly stated otherwise.

According to a sixth aspect of the invention, the object is achieved by a method according to claim 16. Thus, a method for a trailer or dolly is provided, wherein the trailer or dolly comprises a perception sensor which is directed in a first travelling direction of the trailer or dolly and a coupling member for coupling with a vehicle further ahead in the first travelling direction, wherein the method comprises:

providing and/or using data from the sensor for a first control mode when the trailer or dolly is not coupled to the vehicle via the coupling member; and providing and/or using data from the sensor for a second control mode different from the first control mode when the trailer or dolly is coupled to the vehicle via the coupling member.

Advantages and effects of the sixth aspect are largely analogous to the advantages and effects of the first aspect. It shall also be noted that all embodiments of the sixth aspect of the invention are applicable to and combinable with all embodiments of the other aspects of the invention, and vice versa, unless explicitly stated otherwise.

According to a seventh aspect of the invention, the object is achieved by a method according to claim 17. Thus, a method for a vehicle is provided, wherein the vehicle comprises a vehicle perception sensor which is directed in a second travelling direction and a coupling member for coupling with the trailer or dolly according to any one of the embodiments of the second aspect further ahead in the second travelling direction, wherein the second travelling direction is opposite to the first travelling direction, as seen along a travelling trajectory of a vehicle combination comprising the vehicle and the trailer or dolly, wherein the method comprises:

using data from the vehicle perception sensor in a guidance control mode for a vehicle combination comprising the vehicle and the trailer or dolly; and receiving sensor data from the control system of the trailer or dolly for the guidance control mode.

Advantages and effects of the seventh aspect are largely analogous to the advantages and effects of the third aspect. It shall also be noted that all embodiments of the seventh aspect of the invention are applicable to and combinable with all embodiments of the other aspects of the invention, and vice versa, unless explicitly stated otherwise.

According to an eighth aspect of the invention, the object is achieved by a computer program comprising program code means for performing the steps of the method according to any one of the embodiments of the sixth or seventh aspects when said program is run on a computer.

According to a ninth aspect, the object is achieved by a computer readable medium carrying a computer program comprising program code means for performing the steps of the method according to any one of the embodiments of the sixth or seventh aspects when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 3 is a schematic view from above of a vehicle combination according to an example embodiment of the present invention;

FIG. 4 is a schematic view from above of another vehicle combination according to an example embodiment of the present invention;

DETAILED DESCRIPTION OF EXAMPLE EMBODIMENTS OF THE INVENTION

Figure 1:
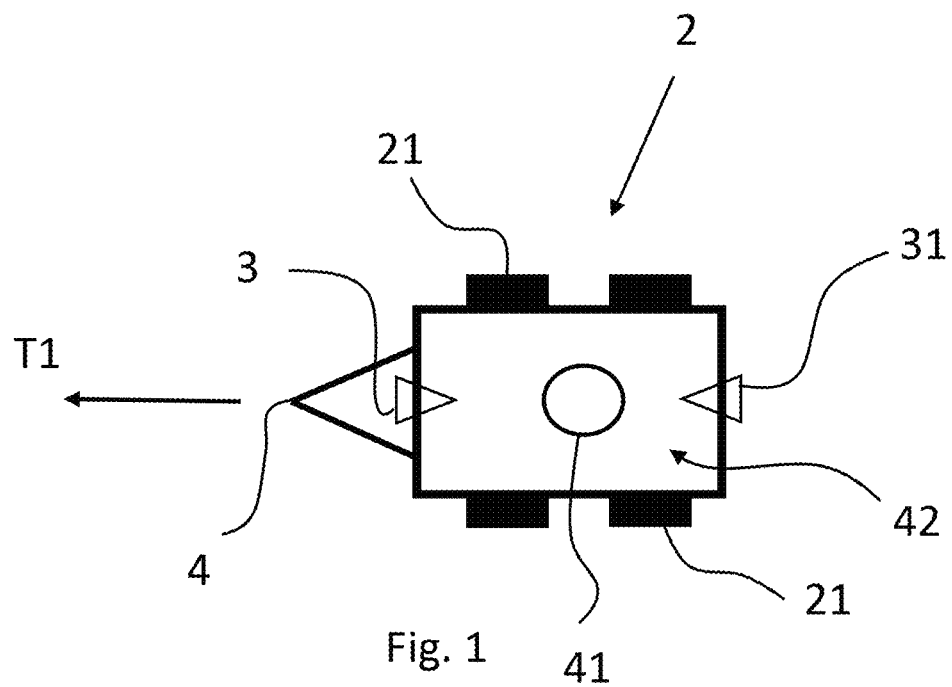
FIG. 1 is a schematic view from above of a dolly according to an example embodiment of the present invention.
Figure 2:
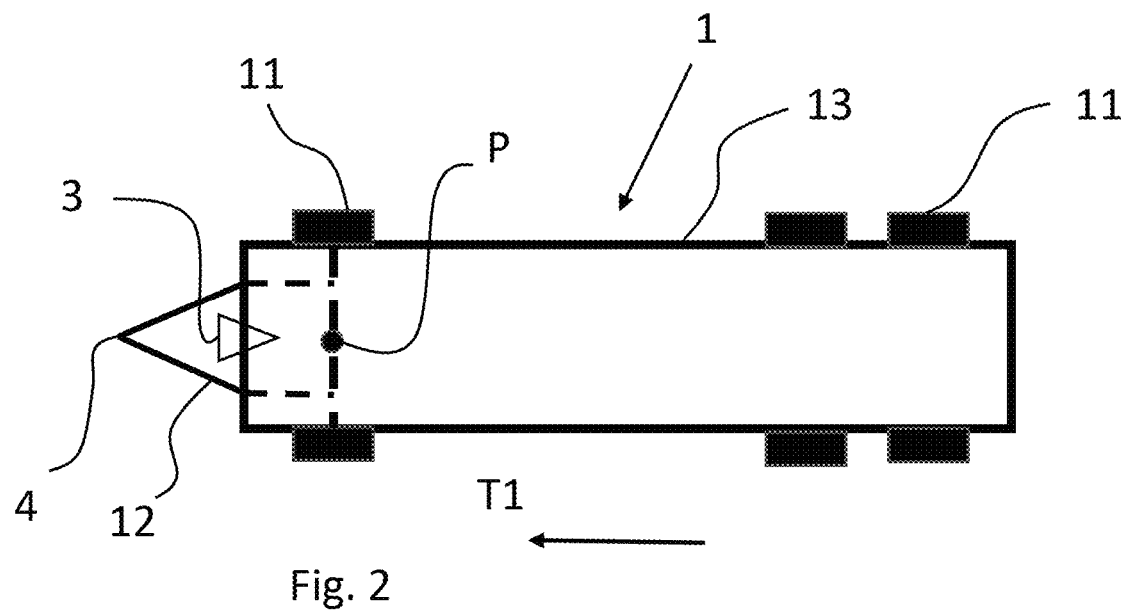
FIG. 2 is a schematic view from above of a trailer according to an example embodiment of the present invention.

FIG. 1 is a schematic view from above of a dolly 2 according to an example embodiment of the present invention and FIG. 2 is a schematic view from above of a trailer 1 according to an example embodiment of the present invention.

The dolly 2 comprises a perception sensor 3 which is directed in a first travelling direction T1 of the dolly 2 and a coupling member 4 for coupling with a vehicle (not shown) further ahead in the first travelling direction T1. The first travelling direction T1 is in this example a forward direction of the dolly 2.

As shown, the dolly 2 preferably further comprises a second coupling member 41 for coupling with a trailer (not shown) further behind with respect to the first travelling direction T1. The second coupling member 41 may as shown be provided on an upwardly facing surface 42 of the dolly 2. The second coupling member 41 may for example be a so called fifth wheel intended to couple a trailer thereto, by use of e.g. a trailer kingpin. The trailer to be coupled to the dolly 2 may for example be a so-called semi-trailer.

As further shown, the dolly 2 may further comprise a second perception sensor 31 which is directed in an opposite direction to the first travelling direction T1. Accordingly, in the shown embodiment, the opposite direction is a rearward direction.

The dolly 2 further comprises a number of wheels 21. In the shown example there are four wheels 21 arranged on a first and a second wheel axle.

The trailer 1 as shown in FIG. 2 also comprises a perception sensor 3 which is directed in a first travelling direction T1 of the trailer 1 and a coupling member 4 for coupling with a vehicle (not shown) further ahead in the first travelling direction T1. The first travelling direction T1 is in this example also a forward direction.

The perception sensors 3 as shown in e.g. FIGS. 1 and 2 are mounted and/or oriented on the dolly 2 and the trailer 1, respectively, so that they can sense and perceive an environment further ahead in the first travelling direction T1. Accordingly, according to an example embodiment, the perception sensor 3 may be configured to obtain at least one image of the environment further ahead in the first travelling direction T1. Thereby, the perception sensor 3 may, by use of the at least one image, sense and perceive a connected vehicle (not shown) when coupled thereto. It may also sense and perceive the environment when no vehicle is coupled to the coupling member 4.

The trailer 1 may be any kind of trailer known to the skilled person. However, the trailer 1 as shown in FIG. 2 comprises an integrated dolly 12, or dolly unit, comprising one wheel axle which is pivotable with respect to a trailer body 13 of the trailer 1 about a pivot axle P. The trailer 1 further comprises a number of wheels 11. In the shown example, two wheels are provided on the wheel axle of the integrated dolly 12 and a total of four wheels 11, two wheels each, are provided on two respective rear wheel axles of the trailer body 13. The integrated dolly 12 may comprise more wheels, such as four wheels arranged on two wheel axles. The pivot axle P may in such embodiments be provided in-between the two wheel axles.

The perception sensor 3 as shown in FIG. 2 is mounted on the pivotable dolly 12 of the trailer 1. However, the perception sensor 3 may in an alternative embodiment be mounted directly on the trailer body 13. Still further, as shown in FIG. 3, the perception sensor 3 may also be mounted so that it also can sense and perceive at least a forward portion of the trailer body 13. Thereby, in such embodiments, the perception sensor 3 may be adapted to e.g. sense and perceive a relative position and/or orientation between the trailer 1 and a connected vehicle 5, but it may also be adapted to sense and perceive a relative position and/or orientation between the dolly 12 and the trailer body 13.

Figure 5:
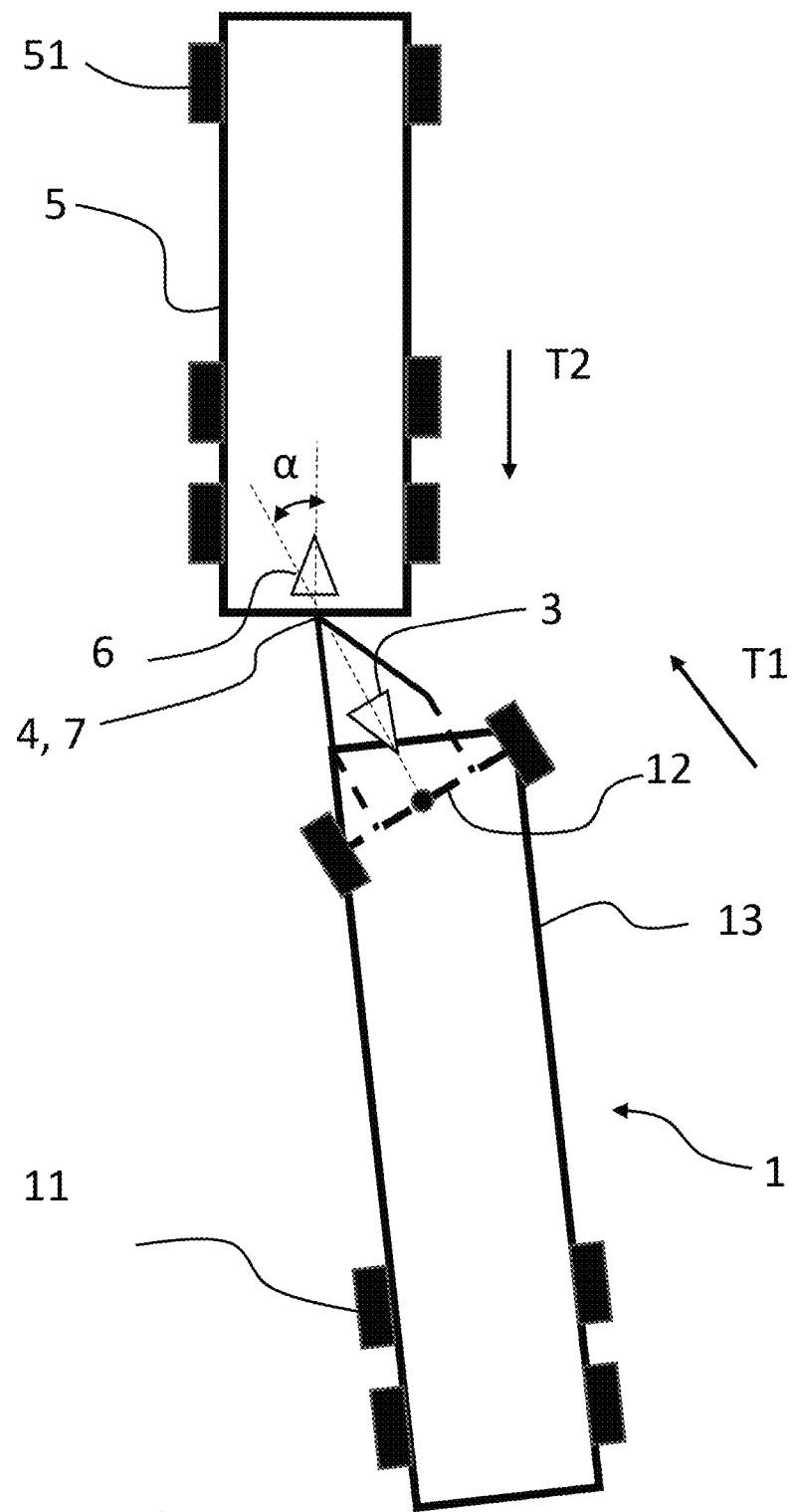
FIG. 5 is a schematic view from above of yet another vehicle combination according to an example embodiment of the present invention.

In FIGS. 3-5, different schematic views from above of embodiments of vehicle combinations according to the present invention are shown. The vehicle combination in FIG. 3 comprises a vehicle 5 and a trailer 1 connected to the vehicle 5, and the vehicle combination in FIG. 4 comprises a vehicle 5 and a dolly 2 connected to the vehicle 5. The trailer 1 and dolly 2 may for example be similar to the trailer 1 and dolly 2 as shown in FIGS. 1 and 2, respectively. However, as shown, the perception sensor 3 of the trailer 1 in FIG. 3 is here mounted at a position so that it also can sense and perceive at least a forward portion of the trailer body 13, as mentioned in the above.

The vehicle 5 as shown in FIGS. 3-5 comprises a vehicle perception sensor 6 which is directed in a second travelling direction T2 and a coupling member 7 for coupling with the trailer 1 or dolly 2 further ahead in the second travelling direction T2. The second travelling direction T2 is opposite to the first travelling direction T1, as seen along a travelling trajectory of the vehicle combination. Accordingly, in the shown embodiments, the second travelling direction T2 is a rearward direction of the vehicle 5 and the vehicle combination, and the first travelling direction T1 is a forward direction of the trailer 1 or dolly 2. The vehicle 5 further comprises a number of wheels 51, i.e. front wheels, which likely are steerable wheels, and rear wheels.

Figure 6:
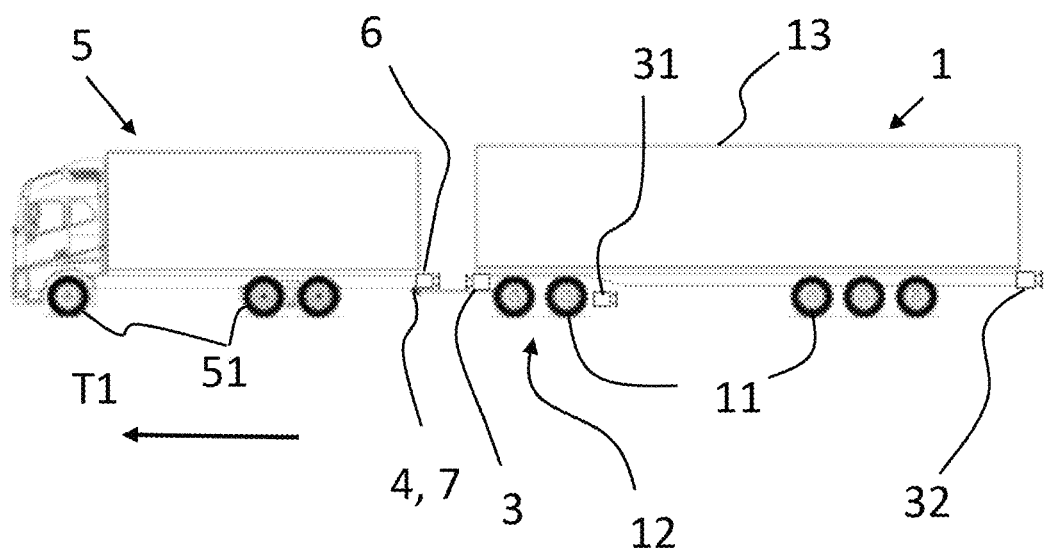
FIG. 6 is a side view of a vehicle combination according to an example embodiment of the present invention.

With respect to FIG. 6, a side view of a vehicle combination according to an example embodiment of the present invention is shown. The vehicle combination may for example be similar to the vehicle combination as shown in FIG. 5. The vehicle 5 is here a heavy-duty truck. In addition to the perception sensor 3, the trailer 1 in the shown embodiment further comprises a second perception sensor 31 and a third perception sensor 32, which are both directed in a direction opposite to the first travelling direction T1. The perception sensor 31 is here mounted on the dolly 12 and adapted to sense and perceive the trailer body 13. As such, according to an example embodiment, the second perception sensor 31 may be configured to determine a relative position and/or orientation between the dolly 12 and the trailer body 13. The third perception sensor 32 may for example be configured to obtain at least one image of an environment behind the trailer.

The perception sensors 3, 31, 32 and 6 may be any kind of perception sensor as e.g. mentioned in the above.

Figure 7:
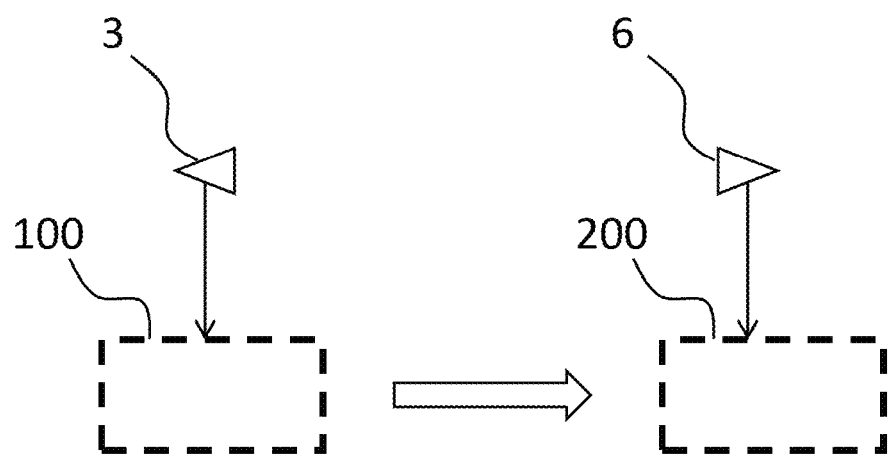
FIG. 7 is schematic views of a control system and a vehicle control system according to example embodiments of the present invention.

With respect to FIG. 7, a control system 100 for a trailer 1 or dolly 2 is shown. FIG. 7 further shows a vehicle control system 200. The control system 100 may for example be part of any one of the trailers 1 or dollies 2 as shown in FIGS. 1-6. In addition, the vehicle control system 200 may for example be part of any one of the vehicles 5 as shown in FIGS. 1-6.

The control system 100 and the vehicle control system 200 are represented by a respective box with dashed lines. Each one of the control systems 100, 200 preferably comprises an electronic control unit (ECU). The electronic control unit typically includes processing circuitry, one or more memories etc. The electronic control unit may further comprise hardware and/or software for performing methods as disclosed herein and/or is configured as disclosed herein. Accordingly, the electronic control unit and/or the control systems 100, 200 may be a computer. The software may be a computer program as disclosed herein, and the control systems 100, 200 may further comprise a computer readable medium as disclosed herein.

FIG. 7 further shows an arrow between the control system 100 and the vehicle control system 200. The arrow is indicative of that the control system 100 may be configured to provide sensor data from the perception sensor 3 to the vehicle control system 200 for a first and/or a second control mode as disclosed herein. The data may be provided by a wireless connection and/or by a wired connection. The data may in an alternative embodiment also be provided wirelessly via another system, such as a cloud-based system. The data may be processed or un-processed (i.e. raw data) before it is provided to the vehicle control system 200. An advantage of processing the data in the control system 100 before it is provided to the vehicle control system 200 is that less processing power may be required for the vehicle control system 200. For example, it may be advantageous to process the data already in the control system 100, since the control system 100 may already be aware of e.g. geometric properties of the trailer 1 or dolly 2. For example, the data may be calibrated in the control system 100 with respect to the position and/or orientation of the perception sensor 3 before it is provided to the vehicle control system 200.

The control system 100 is configured to provide and/or use data from the sensor 3 for a first control mode when the trailer 1 or dolly 2 is not coupled to the vehicle 5 via the coupling member 4 and to provide and/or use data from the sensor 3 for a second control mode different from the first control mode when the trailer 1 or dolly 2 is coupled to the vehicle 5 via the coupling member 4.

The first control mode may for example be a collision detection mode and/or a guidance control mode for the trailer 1 or dolly 2. Accordingly, when the trailer 1 or dolly 2 is uncoupled, the control system 100 of the trailer 1 or dolly 2 may be configured to use data from the sensor 3 to detect a possible collision of another object when e.g. the trailer 1 or dolly 2 is moving. Still further, when the trailer 1 or dolly 2 is uncoupled, the control system 100 of the trailer 1 or dolly 2 may be configured use data from the sensor 3 for guidance control for the trailer 1 or dolly 2 when the trailer 1 or dolly 2 is moving.

Still further, the second control mode may be a guidance control mode for a vehicle combination which the trailer 1 or dolly 2 is part of when coupled to the vehicle 5. For example, the data from the sensor 3 for the second control mode may be indicative of an articulation angle α (see FIG. 5) of the vehicle combination which the trailer 1 or dolly 2 is part of when coupled to the vehicle 5. In the example shown in FIG. 5, the articulation angle α is an articulation angle between the trailer 1 and the vehicle 5. More specifically, the articulation angle α is in the shown embodiment an angle at the coupling point of the coupling members 4 and 7. However, as mentioned in the above, the perception sensor 3 may also be positioned so that it can e.g. sense and perceive a relative position and/or orientation between the integrated dolly 12 and the trailer body 13. Thereby, the control system 100 and/or the vehicle control system 200 may by use of the perception sensor 3 be able to determine a relative angle between the vehicle 5 and the dolly 12, and also between the dolly 12 and the trailer body 13. Said angles may advantageously be used in a guidance control mode of the vehicle combination, such as a reverse assistance control mode.

For example, in a guidance control mode, the vehicle combination may follow a predetermined path (not shown), whereby the path is followed by controlling any one of the aforementioned angles during movement of the vehicle combination. The angles may be continuously obtained and provided in a control loop in order to reduce a deviation of a current direction of the vehicle combination with respect to the predetermined path.

The data from the sensor 3 for the second control mode may alternatively or additionally be indicative of an articulation angle change of the vehicle combination which the trailer 1 or dolly 2 is part of when coupled to the vehicle 5, such as an articulation angle change between the trailer 1 or dolly 2 and the vehicle 5. Accordingly, the data for the second control mode may be indicative of an absolute angle and/or of an angle change of the absolute angle.

The control system 100 may be configured to provide data in the first control mode from the sensor 3 to the vehicle 5 during a coupling procedure with the vehicle 5. For example, the provided data from the sensor 3 to the vehicle 5 during the coupling procedure may be indicative of a relative position and/or orientation between the trailer 1 or dolly 2 and the vehicle 5. Still further, the provided data from the sensor 3 to the vehicle 5 during the coupling procedure may comprise image data for a user of the vehicle 5 so that the user can see an image of the vehicle 5 during the coupling procedure.

The trailer 1 or dolly 2 may further comprise means for longitudinal and/or lateral motion control. For example, the means for longitudinal and/or lateral motion control may comprise one or more actuators for e.g. actuating steerable wheels of the dolly 2 or for pivoting the dolly 12 of the trailer 1. Alternatively, or additionally, drivable wheels of the trailer 1 or dolly 2 may be operated at different speeds in order to steer the trailer 1 or dolly 2. The longitudinal and/or lateral motion may be controlled by the control system 100. Still further, the longitudinal and/or lateral motion control may be adapted to be operated remotely from the trailer 1 or dolly 2. For example, an operator at a logistics area or the like may remotely control the trailer 1 or dolly 2 when it is not coupled to e.g. a towing vehicle. As such, the control system 100 may comprise communication means for wirelessly communicating with a remote system.

The trailer 1 or dolly 2 may further comprise means for autonomous motion control. For example, the trailer 1 or dolly 2 may be adapted to drive autonomously at relatively low speeds, such as speeds up to 10, 20 or 30 km/h.

In view of the above, the trailer 1 or dolly 2 may further comprise a propulsion unit (not shown), such as an electric motor for propelling the trailer 1 or dolly 2, whereby the propulsion unit is controlled by the means for longitudinal and/or lateral motion control.

The vehicle control system 200 is configured to use data from the vehicle perception sensor 6 in a guidance control mode for a vehicle combination comprising the vehicle 5 and the trailer 1 or dolly 2, and the vehicle control system 200 is further configured to receive sensor data from the control system 100 of the trailer 1 or dolly 2 for the guidance control mode. As such, at least two sensors, 3 and 6, may be used for the guidance control mode. Thereby, a further improved determination of an articulation angle between the vehicle 5 and the trailer 1 or dolly may be provided. For example, the articulation angle α may be determined, or estimated, by use of both sensors 3, 6, implying a more reliable and robust determination.

Figure 8A:
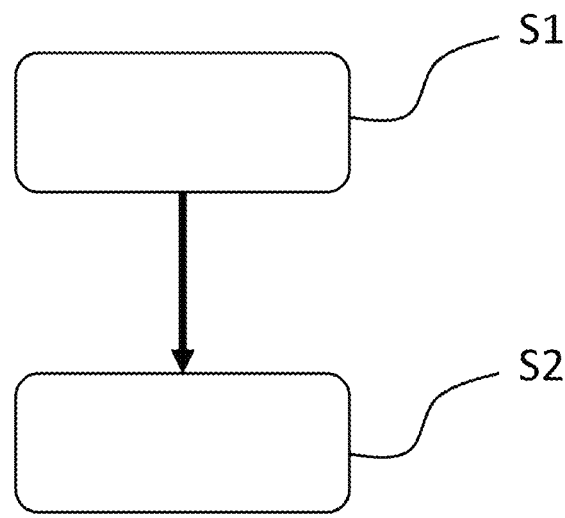
FIGS. 8a-b are flowcharts of methods according to example embodiments of the present invention.

FIG. 8*a* shows a flowchart of a method for a trailer 1 or dolly 2, wherein the trailer 1 or dolly 2 comprises a perception sensor 3 which is directed in a first travelling direction T1 of the trailer 1 or dolly 2 and a coupling member 4 for coupling with a vehicle 5 further ahead in the first travelling direction T1, wherein the method comprises:

S1: providing and/or using data from the sensor 3 for a first control mode when the trailer 1 or dolly 2 is not coupled to the vehicle 5 via the coupling member 4; and S2: providing and/or using data from the sensor 3 for a second control mode different from the first control mode when the trailer 1 or dolly 2 is coupled to the vehicle 5 via the coupling member 4.

Figure 8B:
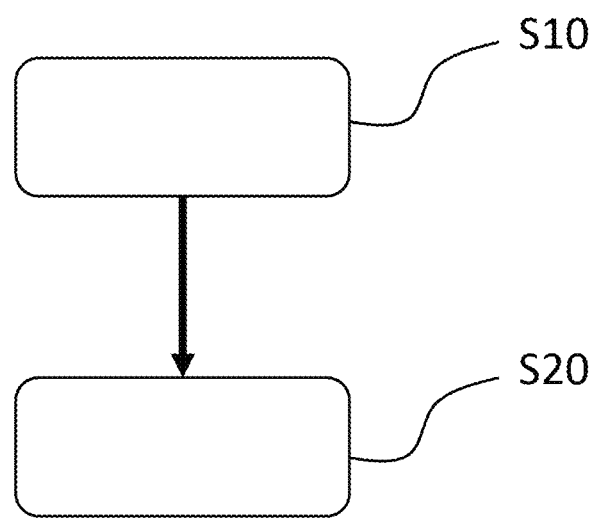

FIG. 8*b* shows a flowchart of a method for a vehicle 5, wherein the vehicle 5 comprises a vehicle perception sensor 6 which is directed in a second travelling direction T2 and a coupling member 7 for coupling with the trailer 1 or dolly 2 as disclosed herein further ahead in the second travelling direction T2, wherein the second travelling direction T2 is opposite to the first travelling direction T1, as seen along a travelling trajectory of a vehicle combination comprising the vehicle and the trailer or dolly, wherein the method comprises:

S10: using data from the vehicle perception sensor 6 in a guidance control mode for a vehicle combination comprising the vehicle 5 and the trailer 1 or dolly 2; and S20: receiving sensor data from the control system 100 of the trailer 1 or dolly 200 for the guidance control mode. The data is thus sensor data obtained by the perception sensor 3.

It is to be understood that the present invention is not limited to the embodiments described above and illustrated in the drawings; rather, the skilled person will recognize that many changes and modifications may be made within the scope of the appended claims.

The invention claimed is:

1. A trailer or dolly, comprising:
   a perception sensor which is directed in a first travelling direction of the trailer or dolly a coupling member for coupling with a vehicle further ahead in the first travelling direction; and
   a control system configured to provide and/or use data from the sensor for a first control mode when the trailer or dolly is not coupled to the vehicle via the coupling member and to provide and/or use data from the sensor for a second control mode different from the first control mode when the trailer or dolly is coupled to the vehicle via the coupling member.

2. The trailer or dolly according to claim 1, wherein the first control mode is a collision detection mode and/or a guidance control mode for the trailer or dolly.

3. The trailer or dolly according to claim 1, wherein the second control mode is a guidance control mode for a vehicle combination which the trailer or dolly is part of when coupled to the vehicle.

4. The trailer or dolly according to claim 3, wherein the data from the sensor for the second control mode is indicative of an articulation angle of the vehicle combination which the trailer or dolly is part of when coupled to the vehicle.

5. The trailer or dolly according to claim 3, wherein the data from the sensor for the second control mode is indicative of an articulation angle change of the vehicle combination which the trailer or dolly is part of when coupled to the vehicle, such as an articulation angle change between the trailer or dolly and the vehicle.

6. The trailer or dolly according to claim 1, wherein the control system is configured to provide data in the first control mode from the sensor to the vehicle during a coupling procedure with the vehicle.

7. The trailer or dolly according to claim 6, wherein the provided data from the sensor to the vehicle during the coupling procedure is indicative of a relative position and/or orientation between the trailer or dolly and the vehicle.

8. The trailer or dolly according to claim 6, wherein the provided data from the sensor to the vehicle during the coupling procedure comprises image data for a user of the vehicle so that the user can see an image of the vehicle.

9. The trailer or dolly according to claim 1, further comprising means for longitudinal and/or lateral motion control.

10. The trailer or dolly according to claim 9, wherein the longitudinal and/or lateral motion control is adapted to be operated remotely from the trailer or dolly.

11. The trailer or dolly according to claim 9, further comprising means for autonomous motion control.

12. A vehicle control system for a vehicle, wherein the vehicle comprises a second vehicle perception sensor which is directed in a second travelling direction and a second coupling member for coupling with the trailer or dolly according to claim 9 further ahead in the second travelling direction, wherein the second travelling direction is opposite to the first travelling direction, as seen along a travelling trajectory of a vehicle combination comprising the vehicle and the trailer or dolly, and wherein the vehicle control system is configured to use data from the vehicle perception sensor in a guidance control mode for a vehicle combination comprising the vehicle and the trailer or dolly, and wherein the vehicle control system is further configured to receive sensor data from the control system of the trailer or dolly for the guidance control mode.

13. The vehicle comprising the vehicle perception sensor which is directed in the second travelling direction and the coupling member for coupling with a trailer or dolly further ahead in the second travelling direction, and further comprising the vehicle control system according to claim 12.

14. A vehicle combination comprising a vehicle according to claim 13 and a trailer or dolly.

15. A method for a trailer or dolly, wherein the trailer or dolly comprises a perception sensor which is directed in a first travelling direction of the trailer or dolly and a coupling member for coupling with a vehicle further ahead in the first travelling direction, wherein the method comprises:
providing and/or using data from the sensor for a first control mode when the trailer or dolly is not coupled to the vehicle via the coupling member; and
providing and/or using data from the sensor for a second control mode different from the first control mode when the trailer or dolly is coupled to the vehicle via the coupling member.

16. A method for a vehicle, wherein the vehicle comprises a vehicle perception sensor which is directed in a second travelling direction and a coupling member for coupling with the trailer or dolly according to claim 1 further ahead in the second travelling direction, wherein the second travelling direction is opposite to the first travelling direction, as seen along a travelling trajectory of a vehicle combination comprising the vehicle and the trailer or dolly, wherein the method comprises:
using data from the vehicle perception sensor in a guidance control mode for a vehicle combination comprising the vehicle and the trailer or dolly; and
receiving sensor data from the control system of the trailer or dolly for the guidance control mode.

17. A non-transitory computer readable medium carrying a computer program comprising program code for performing the steps of the method according to claim 15 when said program code is run on a computer.

* * * * *